(12) United States Patent
Agra et al.

(10) Patent No.: US 11,745,597 B2
(45) Date of Patent: Sep. 5, 2023

(54) INERTIAL SUSPENSION MAGNETIC STABILIZER

(71) Applicants: Luis Alberto Agra, Buenos Aires (AR); Juan José Barbery, Buenos Aires (AR)

(72) Inventors: Luis Alberto Agra, Buenos Aires (AR); Juan José Barbery, Buenos Aires (AR)

( * ) Notice: Subject to any disclaimer, the term of this patent is extended or adjusted under 35 U.S.C. 154(b) by 641 days.

(21) Appl. No.: 16/577,971

(22) Filed: Jan. 7, 2020

(65) Prior Publication Data

US 2020/0262298 A1  Aug. 20, 2020

(30) Foreign Application Priority Data

Sep. 20, 2018  (AR) ................................ 20180102688

(51) Int. Cl.
*B60L 13/04* (2006.01)
*B60G 17/015* (2006.01)
*F16F 15/03* (2006.01)

(52) U.S. Cl.
CPC ............ *B60L 13/04* (2013.01); *B60G 17/015* (2013.01); *F16F 15/03* (2013.01); *B60G 2202/16* (2013.01); *B60G 2600/22* (2013.01)

(58) Field of Classification Search
None
See application file for complete search history.

(56) References Cited

U.S. PATENT DOCUMENTS

| | | | | |
|---|---|---|---|---|
| 4,371,798 A | * | 2/1983 | Kuroda | H02K 7/06 310/80 |
| 5,293,969 A | * | 3/1994 | Yamaoka | F16F 15/03 188/266.5 |
| 5,632,361 A | * | 5/1997 | Wulff | F16F 9/3405 188/322.22 |
| 6,050,558 A | * | 4/2000 | Agra | F16F 7/10 267/34 |
| 6,390,252 B1 | * | 5/2002 | Namuduri | F16F 9/535 188/267.2 |
| 2004/0012168 A1 | * | 1/2004 | Jaekel | B60G 13/00 280/124.1 |
| 2014/0238793 A1 | * | 8/2014 | Nanbara | F16F 15/03 188/267 |
| 2018/0001728 A1 | * | 1/2018 | Conti | H02K 35/02 |

FOREIGN PATENT DOCUMENTS

| | | | |
|---|---|---|---|
| CN | 108518438 A | * | 9/2018 |
| WO | WO-2017068601 A1 | * | 4/2017 |

* cited by examiner

*Primary Examiner* — Daniel L Greene
(74) *Attorney, Agent, or Firm* — Sinorica International Patent & Trademark

(57) ABSTRACT

Inertial suspension magnetic stabilizer that complements the suspension of vehicles and mobiles of different nature, opposing and compensating inertially to sudden impulses; mountable to wheel cups or to the wheel axis support, preferably constructed in a body preferably forming a hollow cylinder containing gaseous or liquid fluids, composed of a hermetic tubular body provided at its ends with fixed magnets and in its central area of a magnetically neutral sliding piston, supported by its magnet ends with equal polarity, facing, to that of the magnets fixed at the ends of the tubular body; sliding piston that in turn divides the tubular body into two hermetic chambers linked together, by a tube provided with a fluid regulating valve.

1 Claim, 1 Drawing Sheet

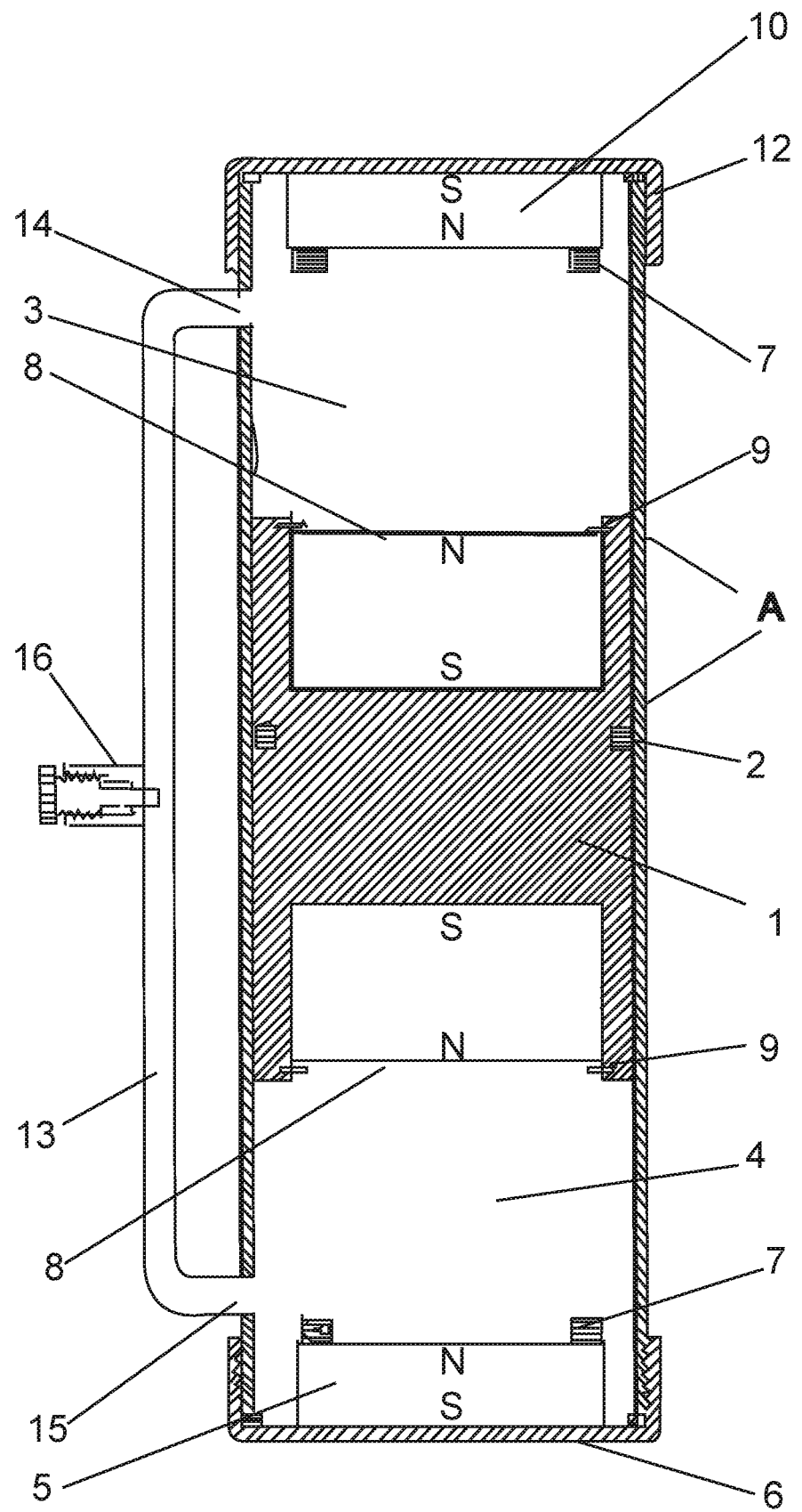

INERTIAL SUSPENSION MAGNETIC STABILIZER

This invention proposes a very simple mechanism that complements the suspensions in vehicles and mobiles to soften the sudden pounding in the depressions, holes, wells, and others of a road, which provokes bites and injuries to covers, innertubes, in addition to the strong and abrupt vehicle, passenger and cargo rebounds.

Our stabilizing mechanism is obtained by the reaction—opposition of the inertia of magnetic bodies installed in an internal sliding floating mass in a hollow cylinder. Mass that is inertially opposed to the sudden initial impulse of the rebound force produced and initiated by the abnormal and surprising movements of moving bodies.

Cylinder containing magnets mounted on a mass slidably suspended inside by the magnetic effects of repulsion that these magnets produce by reacting with magnets preferably fixed on the inner ends (the covers) of the cylinder or hollow body in this example of building it.

This stabilizer will have an appropriate size and shape to the mobile where it is placed. One way to build it is to use a cylindrical tubular body; provided at its inner ends with two respective magnets. Container, also in its central area, of a sliding mass, not conductive of magnetic effects, supported by its magnet ends with the same polarity at its free ends that face it at the ends of the cylinder.

This sliding mass divides the interior of the cylinder into two hermetic chambers linked to each other by a tubular conduit provided with a regulating valve of the passage of the fluid with which it works between both (air, gas, liquid, etc.)

DRAWINGS

The FIGURE conceptually shows the inertial suspension magnetic stabilizer in a central longitudinal section.

REFERENCES: in the following documentation the same letters and the same numbers indicate same, or similar, or corresponding parts.

PERFORMANCE: described the components and explained the nature of the invention it is described the functional and operational relationship thereof.

The present invention is firmly mounted to the means that support in suspension form the wheel axle in order to complement the work of the shock absorber provided in the vehicles. Or, in order that acting by complementing the shock absorber that is installed and provided with a factory of origin, in order to maintain as long as possible the support of the assembly against the ground, reducing vibrations caused by the shock absorbers, softening the typical standard suspensions. (Fractions of a second)

The cylinder body may be provided with means for attaching it to the wheel axle support with which vehicles or parts of other mobile products are provided at the factory.

Inside the cylinder, a non-magnetizable piston acts freely and slidably, supported in each of its magnet ends. These magnet-supporting pistons, are of weight and size determined by the size and type of vehicle (proportional to the weight that supports the wheel or mobile axle).

The piston "floats" magnetically held in sliding form inside the cylinder A, occupying part of its volume, defining inside the cylinder two air chambers, one upper and one lower so that they act as damping factors.

The tubular cylinder A, closed at its ends, slidably contains in its inner a piston 1, of non-conductive material of magnetism (bronze, aluminum, plastic, . . . not ferrous)

This piston provided in its external sliding wall of seals 2, UPACKIG type, or equivalent that act as a watertight separator of the air of chamber 3, of chamber 4.

This piston 1, made of magnetic non-conductive material, has mounted on its magnet ends, with their same polarities oriented facing with the same of the magnets of the covers, but not together; for example, the negatives N, mounted on the ends of the piston 1, facing the N, of the magnets placed in the inner parts of the covers 11 and 12. As this piston is slidable, the air chamber 3, located in the upper part in the drawing and the chamber 4, in the lower part can be alternately compressed by the assembly that integrates the piston, in this way, the magnets N, of the same, on the other hand they can be approached by the rebound in the direction of the ground compressing and dislodging the air of the respective chamber 4 by shrinking it, sending the air to the chamber 3, while eventually colliding with the magnet 5, positioned and fixed in a cover 6.

This magnet of the cover is covered by a plastic washer 7, which acts as a buffer against extreme shock 8, of the magnet held by a non-ferrous, non-conductive thin washer 9 against the magnet pole N of this piston tip. When approaching and touching the pole N, of the magnet 5, it is braked and rejected towards the central area of the hollow cylinder.

At the other end of the piston 1, the magnets act similarly but in the opposite position. The air chamber 3 has the upper cover 12, in which the magnet 10 is fixedly mounted. On the other hand, both magnets 5 and 10 have in their inners toward the chambers 3 and 4, of respective washers or plastic stops, not conductive.

The lower chamber 4 operates similarly. The magnets are removable, whether screwed or wedged. The faces 8 of the magnets are locked and fastened by washers 9, or other non-conductive means.

Magnets 5 and 10 are fixed by adhesion and or by screws, or other.

The air chambers 3 and 4 are linked, to enable the passage of air between them, by a tubular means 13, which has access to the chamber 3 through its nozzle 14, and the chamber 4, through its nozzle. This strong tube 13 has a valve 16 mounted hermetically, which allows to regulate the amount of air that the tube will pass in any direction.

This shock absorber is of universal use, nothing prevents that this magnetic inertial suspension stabilizer from being mounted on the supports of the ski of vehicles for snow or water and thus also on the boat hull (preferably inside the bows) or in the ankles of a human or animal.

Heretofore, a way of building it has been explained, and in a conceptual way how it works.

Completing the documentation with the synthesis of the invention contained in the following claiming clauses.

Having described and determined the nature and scope of the present invention and the manner in which it is to be carried out, it is stated that what is claimed as an invention and exclusive property is:

1. A magnetic suspension stabilizer comprising, a tubular body;
    an air flow duct;
    a piston;
    one upper piston magnetic;
    one lower piston magnetic;
    two piston seals;
    one upper cover;
    one lower cover;
    one upper cover magnet;
    one lower cover magnet;
    one air flow valve;

the piston is arranged within the tubular body separating inside of the tubular body into chamber A and chamber B;

each of the two piston seals is fixed to the piston at opposite sides of the piston;

each of the two piston seals separates the chamber A and chamber B;

the upper piston magnet is fixed to the piston at one end of the piston within the chamber A;

the lower piston magnet is fixed to the piston within the chamber B;

the tubular body comprises an upper end and a lower end;

the upper cover seals the upper end of the tubular body;

the upper cover magnet is fixed to the upper cover, wherein the upper cover magnet is positioned inside of the tubular body;

the upper cover magnet comprises a predetermined magnetic pole UCS and an opposite magnetic pole UCN, wherein the polarity of UCS is opposite of the polarity of the UCN;

the upper cover magnet is fixed to the upper cover by the UCS, wherein the polarity of UCN is facing toward the piston within the chamber A;

two washers are fixed to the UCN;

the lower cover seals the lower end of the tubular body;

the lower cover magnet is fixed to the lower cover, wherein the lower cover magnet is positioned inside of the tubular body;

the lower cover magnet comprises a predetermined magnetic pole LCS and an opposite magnetic pole LCN;

the lower cover magnet is fixed to the lower cover by the LCS, wherein the LCN is facing toward the piston within the chamber B;

two washers are fixed to the LCN;

the upper piston magnet having a predetermined magnetic pole UPN and an opposite magnetic pole UPS;

the upper piston magnet is positioned in a direction wherein the UPN faces the UCN in the chamber A;

two washers lock the upper piston magnet to the piston;

the lower piston magnet has a predetermined magnetic pole LPN and an opposite magnetic pole LPS;

the lower piston magnet is positioned in a direction wherein the LPN faces the LCN in the chamber B;

two washers lock the lower piston magnet to the piston; and the air flow duct connects the chamber A and the chamber B via the air flow valve.

* * * * *